United States Patent [19]

Stakes

[11] 4,237,576
[45] Dec. 9, 1980

[54] BLOWER DEVICE FOR SWEEPING
[75] Inventor: Charles W. Stakes, Nederland, Tex.
[73] Assignee: Electronic Services, Ltd., Nederland, Tex.
[21] Appl. No.: 30,068
[22] Filed: Apr. 16, 1979
[51] Int. Cl.³ .......................... A47L 5/24; A47L 5/14
[52] U.S. Cl. ...................................... 15/344; 15/405; 417/234; 417/424
[58] Field of Search ................. 15/330, 405, 406, 344; 417/38, 234, 424

[56]  References Cited
U.S. PATENT DOCUMENTS

| 2,598,499 | 5/1952 | Breuer et al. | 15/405 X |
| 3,003,177 | 10/1961 | Hijiya | 15/405 X |
| 3,605,786 | 9/1971 | Machin | 15/330 X |
| 3,959,846 | 6/1976 | Yasuba | 15/405 X |

FOREIGN PATENT DOCUMENTS

| 2256875 | 5/1973 | Fed. Rep. of Germany | 15/405 |
| 15116 | of 1908 | United Kingdom | 15/405 |

Primary Examiner—Christopher K. Moore
Attorney, Agent, or Firm—Arnold, White & Durkee

[57] ABSTRACT

A blower device is disclosed for sweeping light debris and clutter. The device includes a pressurized air supply source in communication with a receptacle. A standing head of pressure is developed in the receptacle and then discharged through a nozzle in a jet of air at a substantially constant pressure.

8 Claims, 5 Drawing Figures

BLOWER DEVICE FOR SWEEPING

BACKGROUND OF THE INVENTION

1. Field of the Invention

The present invention relates to blower devices for sweeping, and, more particularly, to portable blower units for diverse applications wherein debris, such as leaves and other lightweight clutter, may be swept from a desired location by pressurized air.

2. Description of the Prior Art

There are several advantages to blower devices which utilize pressurized air to sweep small debris. For example, such devices enable the operator to save effort over the conventional method of manually sweeping such debris. Pressurized air may further be directed into crevices and hard-to-reach corners where a broom may not reach so as to sweep debris that would otherwise be inaccessible. Additionally, since pressurized air is less likely to miss the smaller particles that a broom might miss, blower devices are believed to be more thorough and efficient.

Accordingly, various blower devices have been proposed to accomplish sweeping by means of pressurized air. U.S. Pat. No. 3,099,243 to La Pour illustrates a blower for golf greens which has the limited application of sweeping leaves and debris from a golf green in preparation of putting a ball. This invention shows a fan mounted to a motor which directs air down a shaft to a head. The head is adapted with a slit to direct the air and a brush to sweep debris from the path of the golf ball to be putted. Due to this fan and motor design, it is believed that the apparatus disclosed in La Pour would suffer pressure losses and be inadequate for heavier applications.

U.S. Pat. No. 4,070,771 to Yakiwchuk discloses a portable snow blower for removing snow from the roofs of a building or vehicle. The disclosed apparatus shows a housing formed as a chute for exhausting air so that accumulations of snow may be removed by sliding the end of the chute along the roof. It is believed, however, that the apparatus disclosed in this patent would prove to be unwieldy and demonstate significant pressure losses due to the exhausting of air from the blower directly into the discharge chute.

Devices which are more portable and thereby overcome at least the unwieldiness of Yakiwchuk are shown in U.S. Pat. No. 1,666,350 to Pitt, U.S. Pat. No. 2,586,145 to Breuer, and in a device shown in the November 1978 issue of *Popular Science* on page 93 manufactured by Echo. While these devices are adequate to direct air into generally inaccessible corners and crevices, it is believed that they share a common disadvantage with La Pour and Yakiwchuk. That is, since all of these devices appear to propel air directly from the impeller to a discharge, they are believed to suffer significant pressure losses and irregularities in pressure. Hence, it is believed that wastefully greater power means are required to perform even moderate applications. This, in turn, increases both the expense and the bulk of the device and consumes more energy.

Hence, to provide an improved blower device for sweeping, it is desirable to provide an apparatus which suffers minimal pressure losses, thereby maintaining a substantially constant pressure output.

SUMMARY OF THE INVENTION

The present invention overcomes the prior art disadvantages through a blower device for sweeping which includes a pressurizable receptacle having a discharge port. An impeller member is mounted in the top of the receptacle and is rotatably connected to a suitable means for rotating so that the impelling of the air into the receptacle builds a standing head of pressure in the receptacle. A means for directing the pressurized air in a jet is connected to the discharge port so that the air leaves the receptacle under the pressure built up within.

In one specific embodiment, the blower device includes an air intake housing connected on top of a tube. The tube is then mounted to the top receptacle and a motor is mounted inside of the tube and connected in communication with the impeller member. The resulting electric-motor-driven impeller draws air into the receptacle through the housing and the tube and maintains the air contained therein under a standing head of pressure where it exhausts through the discharge port.

In accordance with another aspect of the invention, the means for directing the pressurized air comprises a cylindrical extension connected to the discharge port and a nozzle connected to the extension so that the nozzle creates a jet of the air discharged under pressure from the receptacle.

In a specific embodiment of the present device, the apparatus includes the electric-motor-driven impeller mounted to the receptacle and the cylindrical extension and nozzle connected to the discharge port. The device further comprises an extended handle mounted to the electric-motor-driven impeller housing in order to facilitate manuevering the apparatus in the desired direction of discharge.

Accordingly, it is believed the present invention provides the following advantages over the motorized devices of the prior art. First, the present invention is believed to provide greater efficiency in terms of pressure output due to the inclusion of the receptacle wherein the standing head of pressure is developed. Because of this increase in efficiency, a motor with a lower power rating may be utilized, thereby giving the device a potentially lower cost and lighter weight. Also, the present invention is easy to use due to its low weight.

These and other advantages and meritorious features will be more fully appreciated from the following detailed description and the appended claims.

DESCRIPTION OF THE PREFERRED EMBODIMENT

It will be appreciated that the present invention can take many forms and embodiments. A preferred embodiment is described so as to give an understanding of the invention, but the description of that embodiment is not intended in any way to limit the true scope and spirit of the invention.

Figure 1:
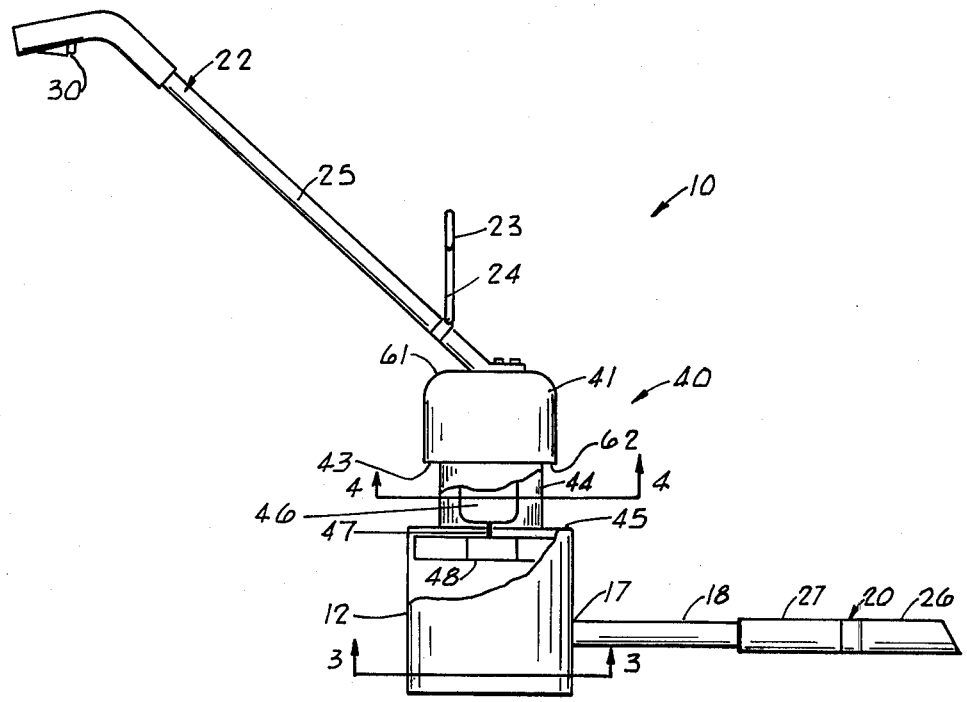
FIG. 1 is a side view of one embodiment of a blower device for sweeping in accordance with the present invention, with a cutaway illustrating the position of the impeller member at the top of a pressurizable receptacle.

Referring now to FIG. 1, blower device 10 comprises a receptacle 12, an impeller unit 40, a discharge extension 18, a jet member 20, an extended handle 22, and a branch handle 24. Receptacle 12 comprises a pressurizable hollow cylindrical member closed at its bottom end and having a discharge port 17 made along the lower half of the side of the receptacle 12. In the preferred embodiment, the receptacle 12 has a diameter of approximately 6 inches and a length of approximately 6 inches and is comprised of sheet metal.

Figure 2:
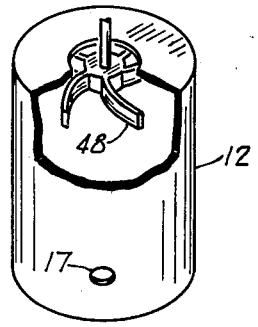
FIG. 2 is a perspective view of the pressurized receptacle with the motor and motor housing tube removed and with cutaway to show the impeller member and receptacle closure member in place.
Figure 3:
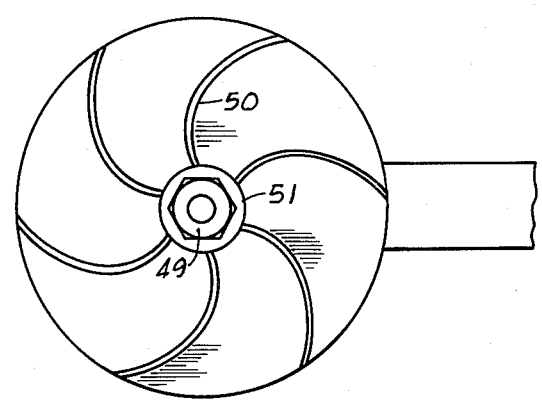
FIG. 3 is a cross sectional view taken along plane 3—3 as shown in FIG. 1, illustrating the impeller member in the top of the receptacle.

Referring now to FIGS. 1-3, impeller unit 40 comprises an air intake housing 41, having apertures 43 on the underside in order to allow the intake of air, a motor housing tube 44, receptacle closure member 45, impeller motor 46, impeller shaft 47, and impeller blade 48. Air intake housing 41 comprises a hollow cylindrical shape and a top end 61 and a bottom end 62. The top end 61 is closed with the edges between the sides of housing 41 and the top end 61 being rounded.

Figure 4:
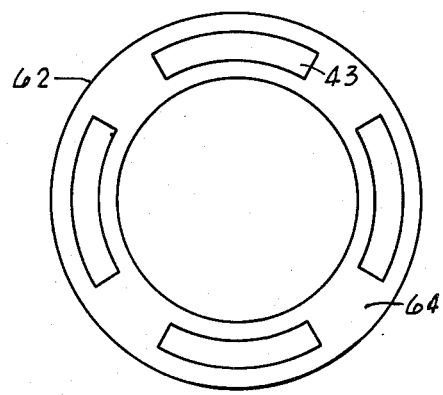
FIG. 4 is a cross sectional view taken along plane 4—4 as shown in FIG. 1, illustrating an air intake housing at the top of the motor housing tube.

Referring to FIG. 4, the bottom end of the air intake housing comprises a lip 64 extending radially inward. The inner edge of the lip is secured to motor housing tube 44. The lip further has apertures 43 to allow the intake of air. Accordingly, air may pass up through apertures 43 into the air intake housing 41 and down to motor housing tube 44 to the receptacle 12.

Referring, again, to FIG. 1, motor housing tube 44 is secured to air intake housing 41 in order to allow the passage of air from the air intake housing 41 through the motor housing tube 44 to the impeller member 48. In the preferred embodiment, motor housing tube 44 comprises a hollow cylindrical member, open at both ends having an outer diameter sufficiently less than the outer diameter of the air intake housing 41 to provide for passage of air to the apertures 43. The motor housing tube 44 is concentrically secured to air intake housing 41 and may be comprised of sheet metal or other suitable material.

Referring to FIGS. 1 and 2, closure member 45 comprises annular member of sufficient diameter to cover the open end of receptacle 12. The closure member 45 has a concentric circular aperture having an inner diameter substantially equal to the inner diameter of the motor housing tube, the closure member 45 being secured in alignment to the motor housing tube 44 at the aperture by welding or other suitable means. Closure member 45 is then snuggly secured to receptacle 12 in a suitable airtight joint.

Impeller motor 46 is suitably mounted inside motor housing tube 41 by bolts or other suitable means. Impeller motor 46 may be any power means capable of turning a shaft with an impeller blade at a high velocity of speed. In the preferred embodiment, however, impeller motor 46 comprises a ¾ horsepower, alternating current, electric motor.

Impeller shaft 47 is connected to and rotated by impeller motor 46. In the preferred embodiment, the impeller shaft is substantially centered on the vertical axis of the motor housing tube 44 and extends through the aperture in closure member 45 into receptacle 12.

Referring to FIGS. 1 and 3, impeller member 48 is secured to impeller shaft 47 by suitable means such as a nut 49. In the preferred embodiment, impeller member 48 comprises six arcuate impeller blades 50 connected to an axial member 51. The outer ends of the impeller blades 50 may extend a distance slightly less than the inner diameter of the receptacle 12 in order to provide the maximum blade surface area for the impelling of air while still providing clearance between the impeller blades 50 and the receptacle 12 during rotation of impeller member 48.

In operation, rotation of the impeller member 48 draws air through apertures 43 down connecting tube 44 and through the impeller member 48. The air is then maintained under a standing head of pressure in receptacle 12 until exhausted under pressure through discharge port 17.

As illustrated, extended handle 22 is secured to the top of the air intake housing 41 by bolts or other suitable means. In the preferred embodiment, the handle shaft 25 is comprised of 1 inch diameter hollow pipe and is mounted so that it is angularly displaced from the main body of the blower device. Further, the handle extends in a direction opposite to and in substantial alignment with discharge extension 18 and jet member 20.

Branch handle 24 is secured to extended handle 22 so that it is positioned near the center of weight of the blower device 10 in order to facilitate handling of the device. Branch handle 24 further comprises a handle loop 23. Branch handle 24 is fixedly secured to extended handle 22, but the handle could be pivotally secured, rotatably secured with means for adjustment, or even omitted entirely in accordance with the present invention.

Figure 5:
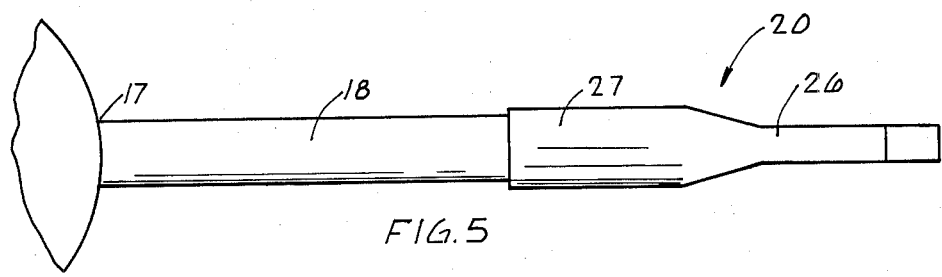
FIG. 5 is a plan view of the extension and nozzle of the blower device illustrated in FIG. 1.

Referring to FIGS. 1 and 5, discharge extension 18 is connected to the discharge port 17 by welding or other suitable means, so that it extends horizontally parallel to the ground when the device rests on a level surface. The discharge extension comprises a hollow cylindrical pipe, open at both ends, which is approximately 8 inches in length and 1.25 inches in diameter.

Connected to discharge extension 18 is jet member 20. The jet member 20 is comprised of a hollow cylindrical section 27 having a suitable inner diameter to snugly fit discharge extension 18. The hollow cylindrical section 27 tapers down to a rectangular nozzle 26. In the preferred embodiment, the jet member 20 has a total length of 10½ inches. It should be apparent to those skilled in the art, however, that other nozzles and discharge extensions having a combined length suitable to create a desired back pressure to the receptacle 12 may be utilized.

Variable speed control 30 is mounted to extended handle 22 and, in the preferred embodiment, comprises an electrical resistance power control reostat. The control 30 communicates with the impeller motor 46 by means of an electrical cord (not shown) which extends internally of the handle 22 for interconnection with the motor 46.

The instant invention has been disclosed in connection with a specific embodiment. However, it will be apparent to those skilled in the art that variations for the illustrated embodiment may be undertaken without departing from the spirit and scope of the invention. For example, the shape and dimensions of the pressurized receptacle and connecting tube could be varied to be adapted to a given impeller unit. As a further alternative, each of the structural parts could be comprised of plastic, metal or other suitable material. Additionally, the means for discharging the air could take a variety of forms and dimensions. Further, the impeller rotating means could be gasoline-powered as well as electric-powered. These and other variations would be obvious to those skilled in the art and are within the spirit and scope of the invention.

Having, therefore, completely and sufficiently described my invention, I now claim:

1. A sweeping device, comprising:
    (a) a portable housing including a receptacle forming an internal chamber to accommodate the establishment therein of a standing head of pressure, the receptacle having an air intake and a discharge port;
    (b) power means mounted in the housing for (i) supplying and pressurizing air in the receptacle (ii) establishing a standing head of pressure in the receptacle and (iii) forcing air into the receptacle and out through the discharge port for sweeping;
    (c) air directional means connected to the discharge port, for directing pressurized air in a jet, in order to sweep small debris; and
    (d) support means interconnected with the housing for accommodating the manual displacement of the sweeping device during use.

2. The device as defined in claim 1, wherein the power means comprises an electric-motor-driven impeller member mounted in the receptacle.

3. The device as defined in claim 1, wherein the means for directing pressurized air comprises a cylindrical extension connected to the discharge port and a nozzle connected to the extension in order to create the jet of air.

4. The device of claim 1 wherein the receptacle comprises a cylinder having a top end and a bottom closed end as oriented for use, and further having the discharge port along the side of the cylinder.

5. The device of claim 4 wherein the housing further includes:
    an annular closure member secured to the top of the receptacle for restricting the opening,
    a tube secured to the annular closure member for supplying the passage of air to the interior of the receptacle by way of the restricted opening;
    an air intake member secured to the top of the tube having venting apertures for the intake of air; and
    wherein the device further includes:
    an electric motor mounted in the tube and having an output shaft extending into the interior of the receptacle, and
    an impeller member mounted on the shaft internally of the receptacle for developing the standing head of pressure.

6. The device as defined in claim 5, wherein the means for directing pressurized air comprises a cylindrical extension connected to the discharge port and a nozzle connected to the extension in order to create the jet of air.

7. The device of claim 6 wherein the cylindrical extension and the nozzle are oriented substantially horizontally for use.

8. The device of claim 7, wherein the support means interconnected with the housing includes:
    an extended handle formed of a hollow cylindrical member mounted to the air intake, the handle extending angularly upwardly in a direction opposite to and in alignment with the cylindrical extension; and
    a branch handle comprising a hollow cylindrical tube mounted to the extended handle; and
    wherein the device further includes:
    a variable speed control mounted in the extended handle and being electrically interconnected with the electric motor.

* * * * *